United States Patent

Labrie et al.

[11] Patent Number: 5,549,324
[45] Date of Patent: Aug. 27, 1996

[54] CONSTRUCTION AND METHOD OF FORMING A DOOR ASSEMBLY FOR AN AIR SYSTEM

[75] Inventors: Craig B. Labrie; David R. McCooey, both of Dover, N.H.; Claude E. Bemis, York, Me.

[73] Assignee: Davidson Textron Inc., Dover, N.H.

[21] Appl. No.: 500,596

[22] Filed: Jul. 11, 1995

[51] Int. Cl.⁶ .................................................. B60R 21/16
[52] U.S. Cl. ...................... 280/728.3; 280/732; 264/46.5
[58] Field of Search ................................ 280/728.3, 732, 280/208.1, 743.1, 731; 180/90; 296/70; 264/46.5, 46.4, 46.6, 241, 242, 255, 275; 425/130

[56] References Cited

U.S. PATENT DOCUMENTS

| | | | |
|---|---|---|---|
| 4,852,907 | 8/1989 | Shiraki et al. | 280/731 |
| 4,925,209 | 5/1990 | Sakurai | 280/743 |
| 4,952,351 | 8/1990 | Parker et al. | 264/46.5 X |
| 4,968,057 | 11/1990 | Rafferty | 280/731 |
| 4,989,896 | 2/1991 | DiSalvo et al. | 280/732 |
| 5,069,477 | 12/1991 | Shiraki | 280/732 |
| 5,082,310 | 1/1992 | Bauer | 280/732 |
| 5,256,354 | 10/1993 | Chadwick | 264/119 |
| 5,288,103 | 2/1994 | Parker et al. | 280/728 |
| 5,316,334 | 5/1994 | Skidmore | 280/728.3 |
| 5,320,381 | 6/1994 | Burns et al. | 280/728.3 |
| 5,344,183 | 9/1994 | Hersman et al. | 280/728 |
| 5,378,014 | 1/1995 | Cooper | 280/728 |
| 5,382,047 | 1/1995 | Gajewski | 280/728 |
| 5,394,602 | 3/1995 | Czapp et al. | 264/46.5 X |
| 5,458,361 | 10/1995 | Gajewski | 280/728.3 |

FOREIGN PATENT DOCUMENTS

| | | | |
|---|---|---|---|
| 0583079 | 2/1994 | European Pat. Off. | 280/728.3 |
| 5-185897 | 4/1993 | Japan | B60R 21/20 |
| 2257398 | 1/1993 | United Kingdom | 280/728.3 |

*Primary Examiner*—Christopher P. Ellis
*Attorney, Agent, or Firm*—Reising, Ethington, Barnard & Perry

[57] ABSTRACT

A door cover assembly for concealing a supplemental inflatable restraint (SIR) system of an automotive interior trim component includes a substrate having a door section in which formed depressions are provided to strengthen the door. The depressed regions are filled with a secondary foam insert to level the outer surface of the substrate. A primary foam layer overlies the substrate and is covered by an outer vinyl shell. The leveling of the substrate by the secondary foam insert eliminates "show through" of the depressed regions on the outer Class A surface of the vinyl shell.

11 Claims, 3 Drawing Sheets

CONSTRUCTION AND METHOD OF FORMING A DOOR ASSEMBLY FOR AN AIR SYSTEM

This invention relates generally to supplemental inflatable restraint (SIR) airbag-type systems for automotive vehicle applications and more particularly to constructions and methods of manufacturing the door assembly used for concealing an SIR system installed within a deployment opening provided in an interior trim panel of the vehicle.

BACKGROUND OF THE INVENTION

Door assemblies for SIR airbag-type systems typically include a substrate, often of ductile metal, having a door section, a mounting section for attachment to the support structure of the vehicle, and an intermediate hinge section that enables the door section to swing outwardly about the hinge upon deployment of the airbag through the deployment opening. A decorative outer skin layer is provided having an outer so-called "Class A" surface that is seen by the occupants of the vehicle. Foam plastic (e.g. polyurethane) is injected in a flowable state between the substrate and the outer skin through an opening in the door section whereupon it flows throughout the space and expands to fill the space with the foam. The foam is provided not only to cushion the door assembly for safety reasons, but also to provide a smooth backing for the outer skin so that any imperfections of the substrate do not show through on the Class A surface of the outer skin.

Difficulties have been encountered in applications where the door section is formed with reinforcing ribs that leave deep depressions in the exterior surface of the door section. In such cases, the foam in the depressed regions is caused to develop with relatively less density than that in the adjacent non-depressed regions and, over time, results in the depressions "showing through" on the Class A surface as a slightly sunken soft spot. In such cases, then, the foam does not adequately serve its function of concealing the irregularities of the door section to prevent them from being transferred to the Class A surface of the outer skin.

SUMMARY OF THE INVENTION

This invention overcomes the aforementioned deficiencies by prefilling the depressed regions of the substrate with secondary filler material to the level and general profile of the surrounding exterior surface of the substrate before injecting primary foam into the space between the substrate and outer skin such that any variation in the density of the primary foam is not attributed to the presence of depressed regions, so as to lessen or eliminate the "show through" defects on the Class A surface.

According to another aspect of the invention, the secondary filler is a preformed foamed insert having the size and shape of the depressed regions and installed within the depressed regions to provide the uniform profile to the door section.

THE DRAWINGS

The presently preferred embodiment of the invention is disclosed in the following description and in the accompanying drawings, wherein.

DETAILED DESCRIPTION

Figure 1:
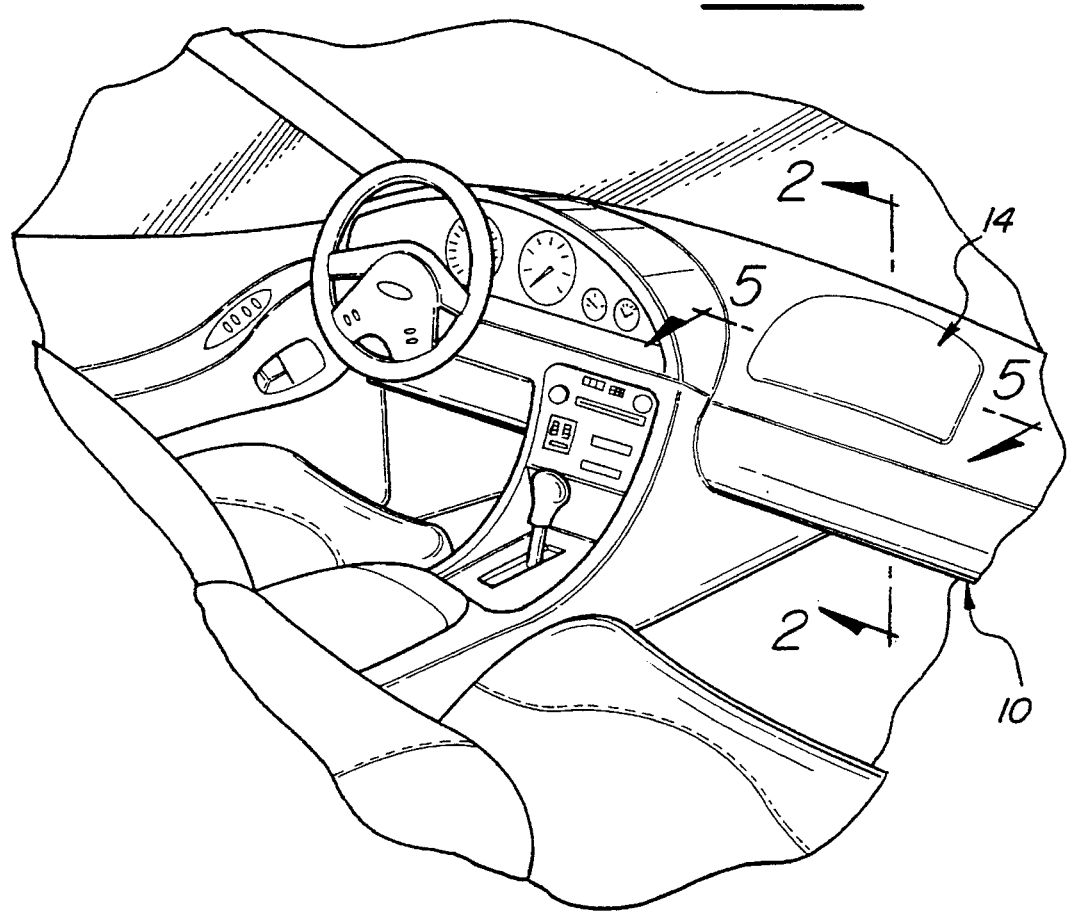
FIG. 1 is a fragmentary perspective view of a passenger compartment of an automotive vehicle showing a trim panel equipped with an SIR airbag system and door assembly according to a presently preferred embodiment of the invention.

FIG. 1 shows an instrument trim panel 10 of an automotive vehicle having a supplemental inflatable restraint (SIR) airbag-type system 12 (FIG. 2) concealed beneath a cover or door assembly 14 constructed in accordance with a presently preferred embodiment of the invention.

Figure 2:
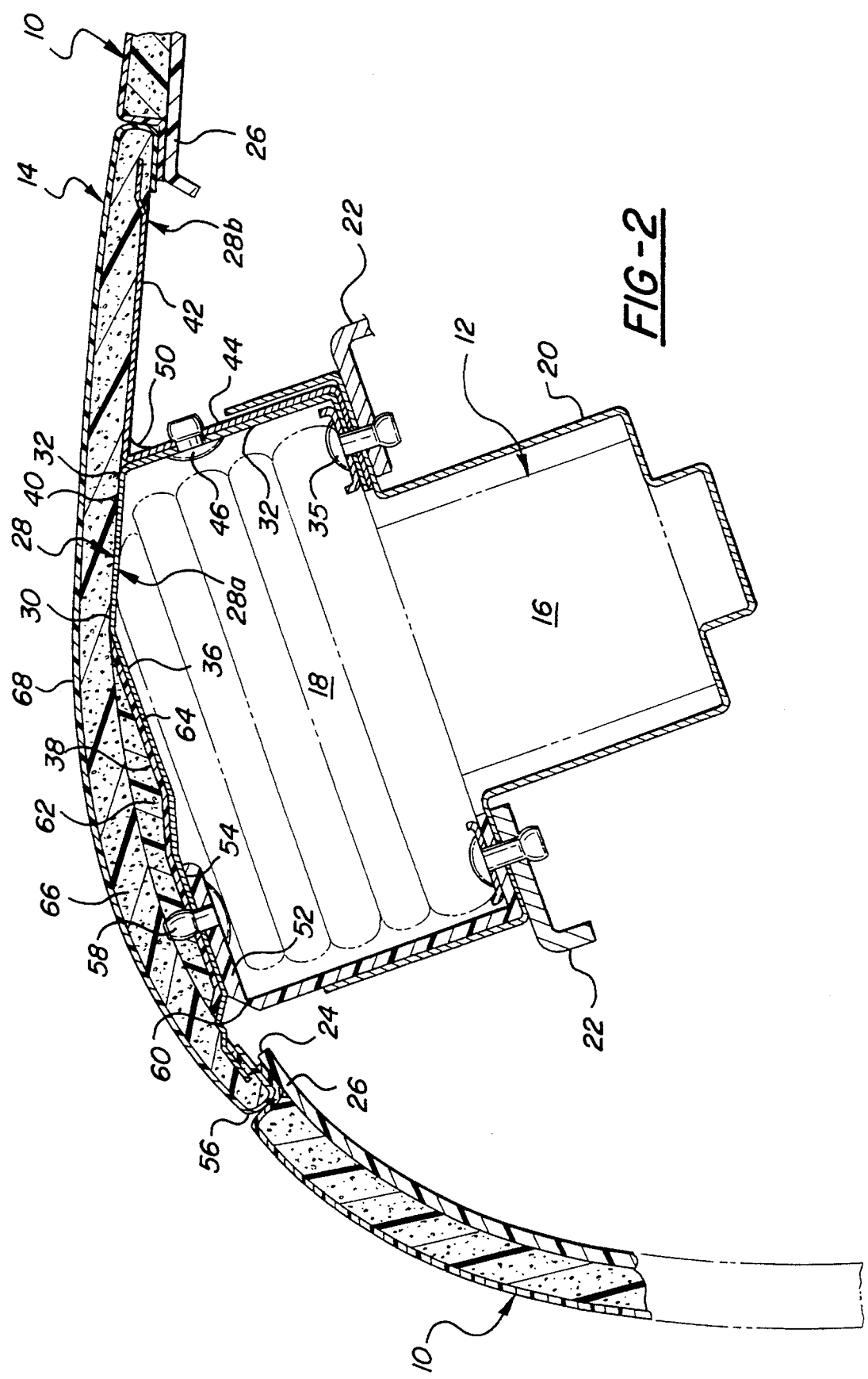
FIG. 2 is a fragmentary transverse cross sectional view taken along lines 2—2 of FIG. 1.

The SIR system 12 has a gas generator 16 coupled to an inflatable airbag 18 and housed within a canister 20 mounted beneath the trim panel 10 on support structure 22 of the vehicle as is conventional. The canister 20 has an open top that is aligned with a deployment opening 24 formed in the panel 10 through which the airbag 18 is deployed and which is covered by the door assembly 14. As shown in FIGS. 1 and 2, the door assembly 14 is configured to match the adjacent contours of the outer surface of the trim panel, and has a perimetral shape that closely matches the shape of the deployment opening 24. The door assembly 14 is recessed into the opening 24, as shown, and supported about its perimeter against inward movement by an underlying flange 26 of the trim panel 10.

The door assembly 14 includes a substrate 28 having a rearward portion 28a and a forward portion 28b, as illustrated in FIG. 2, and so-named for their relative positions with respect to the passenger compartment when installed in the opening 24 of the trim panel 10. A door section 30 of the substrate extends across the open top of the canister 20 directly over the airbag 18 and is hinged along a forward edge section 32 to an integral mounting section 34 that extends transversely from the door section 30 into the canister 20 where it is secured to the canister 20 and/or to other support structure 22 of the vehicle, by suitable fasteners such as rivets 35.

Figure 3:
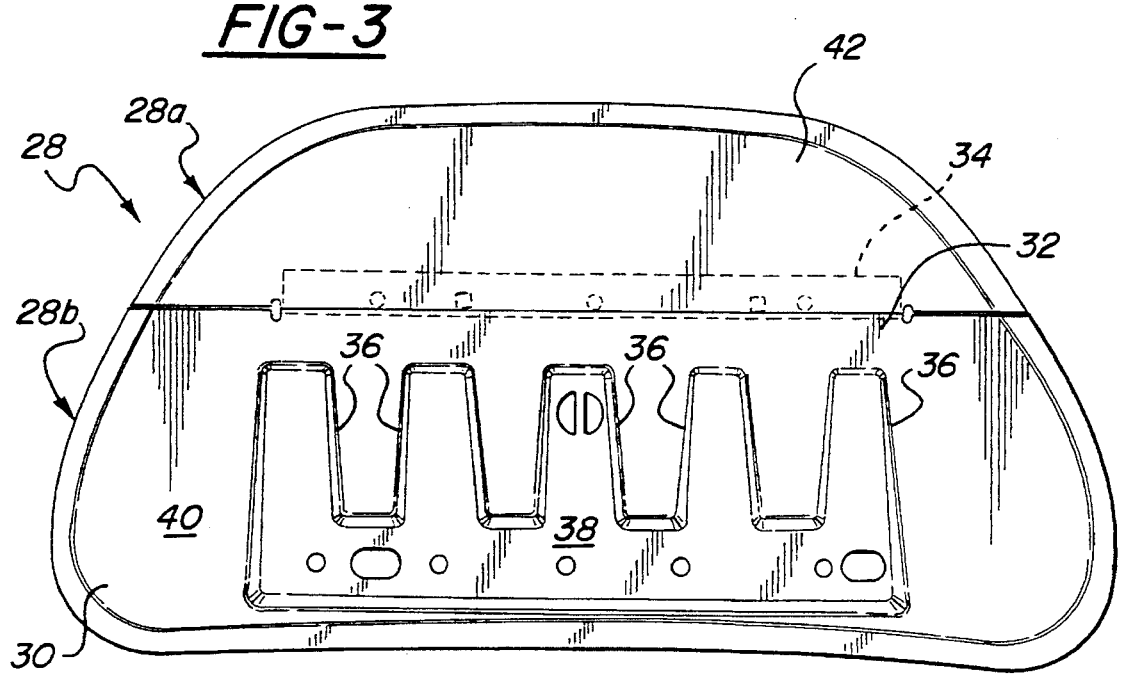
FIG. 3 is a plan view of the door section of the substrate.

The door section 30 and adjoining hinge 32 and mounting sections 34 of the rearward substrate portion 28a are formed preferably as one panel out of a ductile metal material such as aluminum. The yieldability of such material under load enables the section 32 to operate as a hinge. To assure that the door section 30 hinges in the proper hinge region 32, at least one and preferably a plurality of reinforcement ribs 36 are formed in the door section 30 away from the hinge region 32 producing one or more depressed regions 38 of predetermined size and shape that extend inwardly of the door section 30 from an outwardly facing exterior surface 40 of the door section, as illustrated best in FIGS. 2, 3, and 5. The size and shape of the depressed regions 38 may vary depending upon the requirements of each SIR system and the materials employed with one such design being illustrated in the drawings. The formed depressions 38 serve to strengthen or stiffen the door section 30 such that when pressure is exerted on the door section 30 by the inflating airbag, the applied force is transferred to the relatively weaker hinge region 32 causing the substrate 28a to bend outwardly in the hinge region 32, rather than the door section 30.

The forward portion 28b of the substrate is relatively less ductile than the rearward portion 28a in order that it may transfer any applied load to the hinge region 32. For this purpose it may be fabricated out of a material such as steel. An upper section 42 of portion 28b provides a forward extension of the door section 30, and an integral mounting section 44 projects transversely of the upper section 42 along side the mounting section 34 of the rearward portion 28a and is secured thereto by rivets 46 or other suitable fasteners or weldments, and in turn secured to the canister 20 and/or to other support structure 22 by the aforementioned rivets 35, as illustrated in FIG. 2. A plurality of stiffening ribs 50 may be formed at the bend between the upper section 42 and mounting section 44 of the front portion 28b to further strengthen the forward portion 28b so that instead of bending under the load it transfers such load to the hinge region 32.

The door assembly 14 normally is held closed by provision of a tear strip 52 that is joined to the bottom side 54 of the door section 30 adjacent a leading rearward edge 56 of the door assembly 10 opposite the hinged region 32 and further joined to the canister 20 and/or to other support structure 22 of the vehicle by suitable fastening means such as a rivets 58, bolts, or the like. A frangible web 60 provides a preweakened region of the tear strip 52 that is designed to break under the force of the airbag 18 when deployed to permit the door assembly 14 to hinge outwardly about the hinge region 32.

Figure 5:
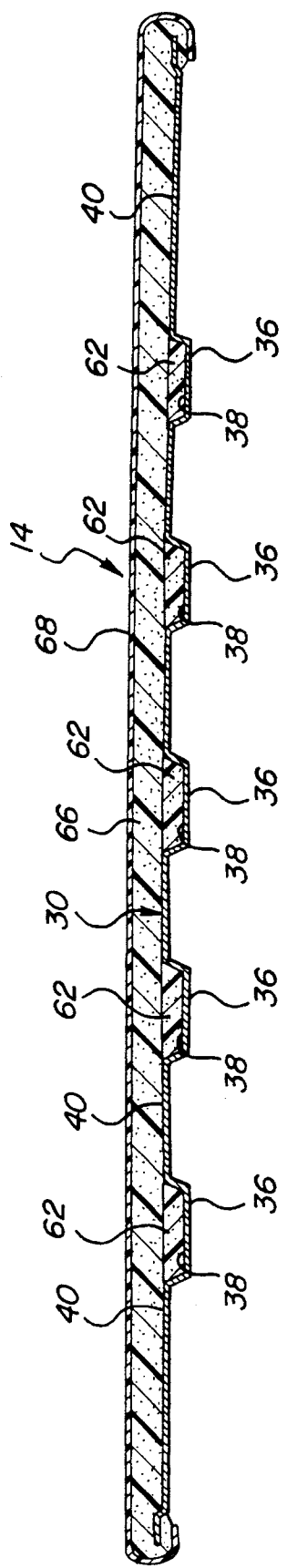
FIG. 5 is a cross-sectional view taken substantially along lines 5—5 of FIG. 1.
Figure 4:
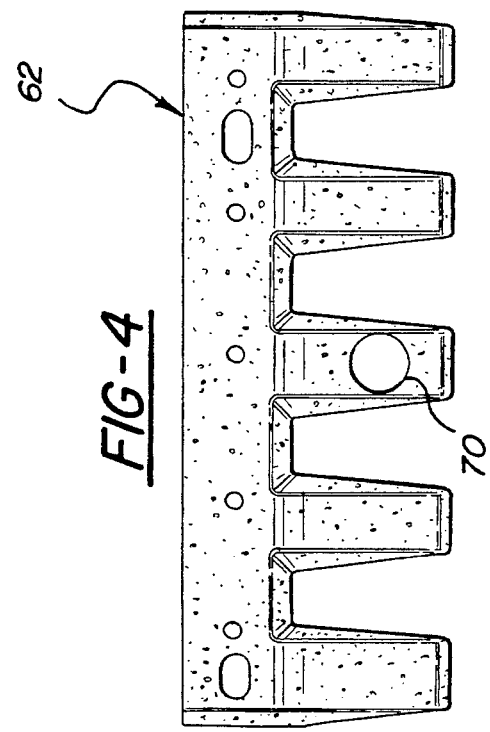
FIG. 4 is a plan view of the secondary foam insert for the substrate of FIG. 3.

As illustrated in FIGS. 2, 4, and 5, the door assembly 14 has a secondary filler element 62 that has generally the same shape, size and volume as the depressed region 38 so as to fill the depressed regions 38 substantially with the secondary filler material 62 to the level and general profile of the surrounding non-depressed regions of the door section effectively to eliminate or substantially lessen the abrupt change in the contour or profile of the outer surface of the door section caused by the presence of the depressed regions 38. It is preferred that the secondary filler 62 be formed as an insert apart from the substrate 28 from foamed polyurethane such as BASF20190, 21300, 2094, or Textron P100/DVC128 or other suitable energy absorbing synthetic foamed plastics material such as polypropylene, polyethylene, polystyrene, ARCEL (polyethylene/polystyrene copolymer), GECET, and DYTHERM. It is contemplated, however, that the secondary filler material 62 could be molded in-place within the depressed regions 38 to fill the pressed regions in the same manner as if the secondary filler were provided as an insert.

The secondary insert 62 is preferably secured to the substrate 28 with an adhesive 64 at the interface between the insert 62 and substrate 28. Suitable adhesives include solvent or water-based adhesives.

Overlying the outer surface 40 of the door section 30 and adjacent upper section 42 of the substrate 28 is a primary layer of suitable energy absorbing elastomeric foam 66, such as polyurethane foam, and preferably of the same polyurethane foam material as that used to make the secondary insert 62. An outer skin or shell 68 of continuous flexible sheet-like material such as vinyl overlies the primary foam 66 and provides an outer decorative so-called "Class A" surface of the door assembly 14 that is made to match that of the adjacent instrument panel 10.

Figure 6:
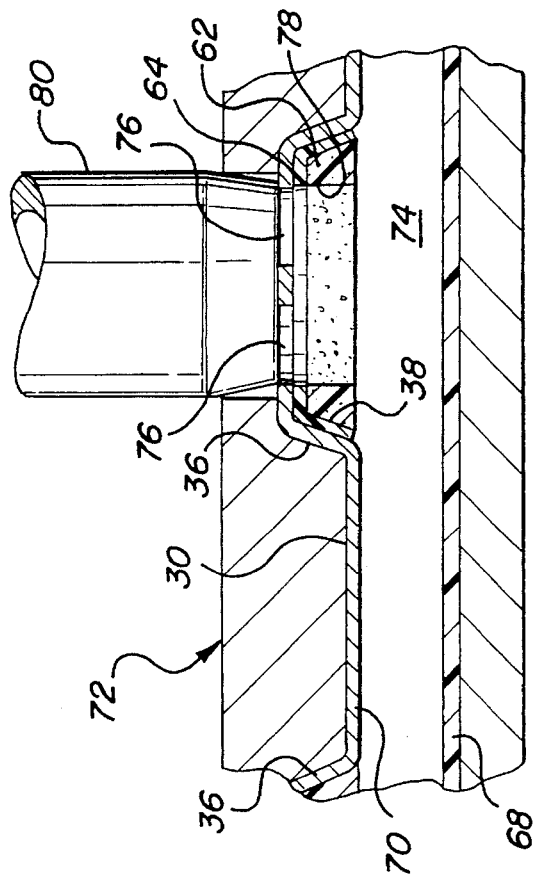
FIG. 6 is an enlarged fragmentary cross-sectional view of the outer skin and substrate of the door assembly positioned in a mold in preparation for the injection of primary foam.

In making the door assembly, the outer skin layer 68 is manufactured according to conventional practice and thereafter placed within a suitable mold cavity 70 of a mold 72 against a wall of the cavity that has a contour or profile corresponding to that to be provided to the door assembly 14. The door and upper sections 30, 42 of the substrate 28 are inserted into the mold cavity 70 with the secondary element 62 having been previously installed in the depressed regions 38 providing a space 74 of generally uniform cross-sectional dimension between the substrate and outer skin 68 as illustrated in FIG. 6. The primary foamed material 66 is then injected from a pour nozzle 80 into the space 74 through aligned preformed pour hole openings 76, 78 in the depressed region 38 of the door section 30 and the secondary element 62. It will be understood by those skilled in the art that the step of injecting the foam is conventional per se and any suitable equipment could be used.

As the primary foam 66 enters the space 74 it commences flowing throughout the space 74 and expanding to fill the entire volume of the space. Having prefilled the depressed regions 38 with the secondary filler 62, the outer surface 40 of the substrate 28 effectively is leveled to provide a generally even uninterrupted backing surface for the primary foam, such that as the primary foam expands and cures, there will be little if any variation of the density of the primary foam 66 attributed to the presence of the depressed regions 38. As shown in FIGS. 2 and 5, the profile or contour of the outer surface of the substrate 28 preferably is made to conform closely to the outer contour of the door assembly 14 such that the primary foam 66 has a generally uniform thickness and a corresponding generally uniform density across the area of the space 74.

The completed door assembly 14 may then be removed from the mold 72 and installed in the deployment opening 24 of the trim panel 10 in the manner described above.

The invention has been described in an illustrative manner, and it is to be understood that the terminology used herein is intended to be in the nature of words of description rather than of limitation. Obviously, many modifications and variations of the present invention could be made in light of the above teachings by one skilled in the art. It is to be understood, therefore, that the invention may be practiced within the scope of the appended claims otherwise than as specifically described above. For example, it is contemplated that similar inserts could be used in conjunction with plastic substrates.

I claim:

1. A method of making a door assembly for covering an air bag deployment opening provided in an interior trim panel of an automotive vehicle, said method comprising the steps of:

forming a substrate with at least one hinged door section formed with a pour hole opening;

forming at least one reinforcement rib in the door section producing a resultant depressed region of predetermined size and shape extending inwardly of the door section from an exterior side surface thereof;

filling the depressed region with secondary filler material to the level and general profile of the surrounding exterior side surface;

positioning an outer skin of flexible material within a mold cavity;

inserting the door section of the substrate into the mold cavity in spaced relation to the outer skin to provide a space therebetween; and injecting primary foam plastic into the space through the pour hole opening and allowing the primary foam to cure producing a resultant primary foam layer between the door section and outer skin layer.

2. The method of claim 1, including forming the secondary filler material from foam plastic as a separate insert apart from the substrate and thereafter installing the secondary foam insert into the depressed region.

3. The method of claim 1 including forming at least the hinged door section of the substrate from ductile sheet metal.

4. A method of making a door assembly for covering an air bag deployment opening provided in an interior trim panel of an automotive vehicle, said method comprising the steps of:

forming a substrate with at least one door section of ductile metal formed with a pour hole opening therethrough;

forming at least one reinforcement rib in the door section producing a resultant depressed region of predetermined size and shape extending inwardly of the door section from an exterior side surface thereof;

forming a secondary foam plastic insert having a shape and size corresponding generally to the predetermined size and shape of the depressed region;

installing the secondary foam plastic insert into the depressed region of the substrate to fill the depressed region to the level and general matching profile of the adjacent exterior side surface of the door section;

positioning an outer skin of flexible material within a mold cavity;

inserting the substrate into the mold cavity with the door section spaced in relation to the outer skin to provide a space therebetween; and injecting primary foam plastic into the space through the pour hole opening and allowing the primary foam to cure producing a resultant primary foam layer between the door section and outer skin layer.

5. The method of claim 4 including selecting polyurethane foam material for producing both the secondary foam plastic insert and the primary foam layer.

6. The method of claim 4 including forming the pour hole opening in the depressed region of the door section and forming a corresponding pour hole opening in the secondary foam insert that is aligned with the pour hole opening of the door section when the insert is installed in the depressed region, and injecting the primary foam plastic into the space through the aligned pour hole openings of the substrate and secondary foam insert.

7. The method of claim 4 including joining the door assembly to the interior trim panel of the vehicle by installing the door section in the deployment opening and securing the substrate to support structure underlying the trim panel.

8. A door assembly for covering an air bag deployment opening provided in an interior trim panel of an automotive vehicle, said assembly comprising:

a substrate having a door section with an exterior surface of predetermined profile and at least one reinforcement rib formed therein acting to stiffen said door section and providing a resultant depressed region of predetermined size and shape extending inwardly of the door section from said exterior surface thereof, and a pour hole opening through the door section;

a secondary filler having a size and shape corresponding generally to that of said depressed region, said secondary filler being disposed within said depressed region to fill said depressed region to the level and general profile of said exterior surface of said door section adjacent said depressed region;

an outer skin of flexible material overlying said exterior surface of said door section and said secondary filler element in spaced relation thereto; and a primary layer of foam plastic formed in place between said door section and said outer skin separately from said secondary foam element.

9. The assembly of claim 8 wherein said secondary filler comprises a preform foam insert formed separate from said substrate and said primary foam layer.

10. The assembly of claim 8 wherein said secondary filler and said primary foam layer comprise polyurethane foam material.

11. The assembly of claim 8 wherein said secondary filler includes a pour hole opening extending therethrough in coaxial alignment with said pour hole opening of said substrate.

* * * * *